Patented Mar. 13, 1928.

1,662,664

UNITED STATES PATENT OFFICE.

WALTER FLEMMING, OF MANNHEIM, GERMANY, ASSIGNOR TO SILESIA VEREIN CHEMISCHER FABRIKEN, OF IDA- UND MARIENHUTTE, POST SAARAU, KREIS SCHWEIDNITZ, GERMANY.

PROCESS FOR THE OXIDATION OF ALKYL-ARYL-SUBSTITUTED DITHIOCARBAMIC ACIDS TO THE CORRESPONDING DISULPHIDES.

No Drawing. Application filed August 16, 1927, Serial No. 213,446, and in Germany October 30, 1926.

The oxidation of alkyl-aryl-substituted dithiocarbamic acids of the methylphenyldithiocarbamic acid type to the corresponding thiuramdisulphides could hitherto only be carried out with certain precautions and by comparatively expensive methods. In practice the oxidation has hitherto been carried out by using the expensive potassium ferricyanide or the even more expensive iodine. Chlorine and bromine do not come into question for this purpose, as they cause an extensive destruction of the substances to be oxidized.

The surprising discovery has been made that the oxidation of the dithiocarbamic acids, referred to above, which always takes place in alkaline solution, can be effected by a mixture of nitric oxide and air without any undesirable by-reactions. If nitric oxide gases together with air are led into an alkaline solution of for instance methylphenyldithiocarbamic acid, the desired disulphide separates out gradually until completely precipitated in the form of white flakes. The nitric oxides obviously act here as air carriers. In spite of the alkalinity of the solution the giving off of an atom of oxygen from the nitrogen dioxide present in the case of an excess of air, is undoubtedly the quicker reaction as compared with the absorption of the nitric oxides by alkali. Consequently the part played here by the nitric oxides in the alkaline solution is similar to that adopted in the transference of atmospheric oxygen in the lead chambers. Naturally the nitric oxides disappear gradually into the alkaline solution, but in view of their cheapness their utilization for this purpose is an economical advantage. The residual liquors containing nitrites and nitrates moreover can be easily worked up into nitrites and nitrates.

Example.

Use is made of a solution of 200 ccm. of the ammonium or alkali salt of methylphenyldithiocarbamic acid, which has been obtained in a known manner by the reaction of 10.7 g. methyl aniline with 7.6 g. carbon disulphide. The clear, watery solution is mixed with 10 g. anhydrous soda and a vigorous stream of nitric oxide and air led through the liquid. The dimethyldiphenylthiuramdisulphide soon separates out in white flakes. The end of the reaction is recognized by the solution which was previously red-yellow becoming light in colour. As soon as this point is reached (time taken about ½ hour) the disulphide is sucked off and washed with water. Fp. 190-195°.

The nitric oxides used for carrying out the oxidation can be obtained in any suitable manner.

What I claim is:—

A process for the oxidation of alkyl-aryl-substituted dithiocarbamic acids to the corresponding disulphides, consisting in oxidizing the said acids in alkaline solution by a mixture of nitric oxide and atmospheric oxygen.

In testimony whereof I have signed my name to this specification.

WALTER FLEMMING.